United States Patent
Parsons et al.

(10) Patent No.: US 7,140,292 B2
(45) Date of Patent: *Nov. 28, 2006

(54) DEVICE, SYSTEM AND METHOD FOR FLUID ADDITIVE INJECTION INTO A VISCOUS FLUID FOOD STREAM

(75) Inventors: Marcus Parsons, Crystal Lake, IL (US); Robert Chatel, Hoffman Estates, IL (US)

(73) Assignee: The Quaker Oats Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/226,953

(22) Filed: Aug. 23, 2002

(65) Prior Publication Data
US 2002/0197374 A1   Dec. 26, 2002

Related U.S. Application Data

(63) Continuation of application No. 09/595,067, filed on Jun. 16, 2000, now Pat. No. 6,509,049.

(51) Int. Cl.
*A23L 1/27* (2006.01)

(52) U.S. Cl. ............... 99/516; 366/173.2; 366/174.1; 366/181.5; 366/181.6; 366/336

(58) Field of Classification Search .............. 99/516, 99/471; 366/173.2, 173.1, 181.5, 181.6, 366/181.8, 336–337, 174.1
See application file for complete search history.

(56) References Cited

U.S. PATENT DOCUMENTS

| | | | |
|---|---|---|---|
| 2,669,946 A | 2/1954 | Peyton | 107/1 |
| 2,772,863 A | 12/1956 | Harney et al. | 259/7 |
| 2,858,217 A | 10/1958 | Benson | 99/83 |
| 2,858,219 A | 10/1958 | Benson | 99/83 |
| 3,064,680 A * | 11/1962 | Winslow, Jr. | 366/340 |
| 3,307,503 A | 3/1967 | Elmer, Jr. et al. | 107/69 |
| 3,314,381 A | 4/1967 | Fries et al. | 107/1 |
| 3,667,732 A | 6/1972 | Lejeune | 259/4 |
| 3,792,839 A | 2/1974 | Gidge | 259/193 |
| 4,114,195 A | 9/1978 | Dirksing et al. | 366/167 |
| 4,454,804 A * | 6/1984 | McCulloch | 99/348 |
| 4,469,475 A | 9/1984 | Krysiak | 425/132 |
| 4,514,095 A | 4/1985 | Ehrfeld et al. | 366/340 |
| 4,616,779 A | 10/1986 | Serrano et al. | 239/79 |
| 4,812,049 A | 3/1989 | McCall | 366/174 |

(Continued)

FOREIGN PATENT DOCUMENTS

EP   92101428.8   2/1992

(Continued)

OTHER PUBLICATIONS

Fox, Robert W.; McDonald, Alan T., Introduction to Fluid Mechanics, 1998, John Wiley & Sonsa Inc, pp. 364-365, 380-384, 531-532, 538-540.*

*Primary Examiner*—Drew Becker
(74) *Attorney, Agent, or Firm*—The Quaker Oats Company (57) ABSTRACT

An apparatus, system and method is provided for injecting a fluid additive into a viscous fluid food flow stream. A fluid additive injector device is utilized to inject the fluid additive which has structure to prevent or minimize the amount of fluid additive that contacts or pools along the periphery of the fluid food flow stream. A fluid additive delivery system is provided to deliver equal amounts of fluid additive to a plurality of fluid additive injectors using a single pump without adjustable flow control apparatus.

25 Claims, 6 Drawing Sheets

U.S. PATENT DOCUMENTS

| | | | |
|---|---|---|---|
| 5,110,276 A * | 5/1992 | Farnsworth et al. | 425/133.1 |
| 5,388,906 A | 2/1995 | Rao | 366/173 |
| 5,469,781 A | 11/1995 | Thom, Jr. | 99/516 |
| 5,486,049 A | 1/1996 | Boatman et al. | 366/175.2 |
| 5,597,236 A * | 1/1997 | Fasano | 366/181.5 |
| 5,620,713 A | 4/1997 | Rasmussen | 425/131.1 |
| 5,776,534 A | 7/1998 | Christensen et al. | 426/516 |
| 5,919,509 A * | 7/1999 | Cremers et al. | 426/516 |
| 6,000,839 A * | 12/1999 | Lott | 366/181.5 |
| 6,132,079 A * | 10/2000 | King | 366/181.5 |
| 6,149,293 A | 11/2000 | Pavese | 366/119 |
| 6,170,979 B1 * | 1/2001 | Smeaton | 366/173.1 |
| 6,509,049 B1 * | 1/2003 | Parsons et al. | 426/250 |
| 6,869,213 B1 * | 3/2005 | Cappellino | 366/171.1 |

FOREIGN PATENT DOCUMENTS

| | | |
|---|---|---|
| EP | 0 501 158 A1 * | 9/1992 |
| WO | 95/05553 | 11/1995 |
| WO | 98/03126 | 8/1998 |
| WO | 98/07906 | 11/1998 |

* cited by examiner

DEVICE, SYSTEM AND METHOD FOR FLUID ADDITIVE INJECTION INTO A VISCOUS FLUID FOOD STREAM

CROSS REFERENCE TO RELATED APPLICATION

This is a continuation of U.S. patent application Ser. No. 09/595,067, filed Jun. 16, 2000, now U.S. Pat. No. 6,509,049.

FIELD OF THE INVENTION

The present invention relates to introducing a fluid additive into a relatively more viscous fluid particularly when the fluid is a food composition extrudate. Specifically, in one aspect, the present invention relates to dividing a fluid food extrudate mass flow into a plurality of subflows each traveling through their own corresponding passageway. Each subflow is then cross-sectionally partitioned wherein a fluid additive is dispersed throughout each subflow.

BACKGROUND OF THE INVENTION

Food products are commonly in some type of fluid form during and/or after processing. Extruders are often used to process various types of food products. Extruders are desirable because they can produce a large amount of a fluid food, which may be a food dough, for example, and more specifically a cooked food cereal dough in a short period of time. Moreover, it is advantageous to divide the fluid food extrudate or other mass food flow into a multiplicity of extrudate subflows by splitting the mass flow and directing these extrudate subflows into and through a plurality of corresponding separate passageways. This enables each extrudate substream to be further manipulated and processed. For example, an additive injection device can then be incorporated into each passageway thereby enabling a suitable type and quantity of fluid additive to be introduced into the extrudate subflow. Additives can be introduced to enhance the flavor, color or texture of the final food product. Thus, either a single food product with one or more desired characteristics (i.e., a ready-to-eat cereal of a desired color or with an assortment of differently flavored and/or colored pieces, for example) or a variety of distinct food products (i.e., an array of distinct snack foods derived from the common extrudate mass flow) can be produced by dividing the extrudate mass flow into subflows.

However, obtaining a desired degree of mixing or a homogenous mixture after introducing a fluid additive into a relatively viscous fluid food extrudate subflow or other fluid food product is troublesome. Typical food dough extrudates may have a viscosity in the range of from about 200,000 to 1,000,000 centipoise, for example. Upon introduction into a fluid food extrudate, a typically less viscous fluid additive (such as a colorant or flavorant) has a tendency to migrate to the exterior periphery of the extrudate where the additive tends to pool without blending with the food extrudate. This pooling at the extrudate's periphery prevents adequate blending of the additive throughout the extrudate mass by static mixers or other mixers located downstream from the additive injection point leaving undesirable pockets or areas of relatively high additive concentration in the extrudate mass.

Dividing a fluid food extrudate mass flow into subflows and subsequently introducing a fluid food additive has inherent shortcomings in addition to pooling or insufficient mixing. Introducing an additive injection device into the cross-sectional flow of the extrudate substream can substantially increase the pressure drop along the length of the passageway where the injection device is present. This increases the overall resistance in the system. When the original extrudate mass flow is divided into a plurality or many subflows, each travelling through a corresponding separate passageway, the additional energy required to drive the highly viscous fluid food extrudate to system's end can be substantial. Moreover, providing an independent additive supply for each additive injection device incorporated within each passageway makes it difficult to obtain a uniform introduction of additive in each of a plurality of extrudate sub flow passageways.

A need exists to more uniformly introduce the same amount of additive across a plurality of food extrudate subflows travelling through separate passageways. A need also exists to more effectively reduce pooling when additive is introduced. Finally, a need exists for an additive injector device that can be easily and readily cleaned and/or sanitized.

SUMMARY OF THE INVENTION

To avoid peripheral pooling, fluid additives are introduced by inserting an additive injector into the passageway perpendicular to the longitudinal axis of the fluid food extrudate subflow. This partitions the subflow mass prior to the introduction of the additive. Splitting or partitioning has the advantage of reducing the amount of static mixing required to blend the additive in the passageway which consequently lowers the overall pressure drop of the device. In this configuration, the additive is dispersed in the center of the extrudate mass subflow thereby offsetting the tendency of the additive to migrate and pool on the extrudate's outer periphery.

In accordance with one aspect of the present invention, an apparatus for injecting a fluid additive into a viscous fluid food flow stream is provided. The apparatus includes a passageway having an interior and an exterior, including an interior wall, which passageway is suitable to accommodate a fluid food flow, which may be a cooked cereal dough, for example, or other material, through the interior of the passageway. Structure is disposed in the passageway for injecting a fluid additive into the fluid food flow in the passageway. The structure in accordance with the invention for injecting the fluid additive can be streamlined to minimize the pressure drop across the injecting structure. In addition, the injecting device may include structure to prevent fluid injected by the injector from contacting the interior wall of the passageway. Such action prevents unwanted pooling or accumulation of additive fluid at the outer portions of the fluid food stream, which can result in an unacceptable or undesirable product.

The fluid additive can be any fluid additive as desired, and may include a colorant, flavor, food supplement or any other desired fluid food additive.

In accordance with another aspect of the present invention, the structure for injecting the fluid additive into the relatively viscous fluid food stream includes a fluid additive manifold located within the passageway, which manifold may be mounted within the passageway. The manifold may be contained within an annular body or other shaped body or portion thereof as desired. A plurality of elongated ribs extend from the manifold and extend transversely across at least a portion of the passageway. Each of the ribs may have a downstream surface and a streamlined upstream surface to minimize pressure loss across the injector device. Generally, the manifold will have an internal fluid additive supply channel, with each of the ribs having an internal fluid additive or extending along an axial length of the rib that is in fluid communication with the channel and with the interior of the passageway. Communication between the channel and the interior of the passageway is achieved through a suitably configured aperture located along a central portion of the downstream portion of the rib and spaced transversely from the interior wall of the passageway. The aperture may be configured as an elongated slot.

Downstream-extending fins can be located between the interior wall of the passageway and the ends of the aperture or slot aperture. Typically, a pair of such fins will be provided for each elongated slot aperture for preventing fluid injected through the opening or slot and into the viscous fluid food flow within the passageway from contacting the interior wall of the passageway. In this manner, unwanted pooling or accumulation of the fluid additive along the wall of the passageway is prevented. Such pooling or migration to the interior wall of the passageway is undesirable because it is very difficult to properly mix, thereby creating undesirable concentrations of the additive fluid in such areas.

In accordance with another aspect of the present invention, the passageways in the fluid injector device are straight and have an exterior line of sight access to permit such passages to be readily cleaned. This is particularly advantageous for various types of food materials that become hardened and have a strong adherence to metal parts, including cooked and dried cereal dough.

Preferably, the ratio of the interior diameter of the passageway to fin width is in the range of from about 6 to about 10 and the ratio of the interior diameter of the passageway to the fin length is in the range of from about 3 to about 15.

Typically, the ribs have an internal passageway or bore that extends along an axial length of each rib that is relatively large in volume compared with the area of the aperture through which the fluid additive can be injected into the passageway. Such an arrangement facilitates the relatively uniform discharge of fluid throughout the length of the aperture or apertures located in the rib.

In accordance with another aspect of the present invention, a system is provided for dispersing a fluid additive into a relatively viscous fluid food flow stream. The system comprises a passageway having an interior and an exterior and including an interior wall. The passageway is suitable to accommodate a fluid food flow through the interior of the passageway. A fluid additive injection device is associated in an operative relation with the interior of the passageway for injecting a fluid additive into a fluid food flow in the passageway. The fluid additive injection device includes a fluid additive manifold, a plurality of elongated ribs extending from the manifold and which extend transversely across at least a portion of the passageway. The manifold has an internal fluid additive supply channel and each of the ribs has an internal fluid additive bore extending along an axial length of the rib in fluid communication with the channel and with the interior of the passageway through a rib aperture preferably located along a central portion of the downstream surface of the rib, face or portion, which aperture is spaced transversely from the interior wall of the passageway. A fluid additive supply source is in fluid communication with the fluid additive manifold. A pump is provided for supplying a constant amount of fluid additive from the supply source to the manifold without utilizing a flow control valve. This can be accomplished in a number of ways, including utilizing piping of equal length and diameter from the pump to each of a plurality of injection devices that may be utilized. Finally, a fluid food mixer is disposed in the passageway downstream of the food additive injection device for mixing the additive to a desired degree. In accordance with the present invention, incomplete mixing is contemplated to provide a swirled or marbled effect or varied concentration of the fluid food additive, which may be a colorant.

In accordance with another aspect of the invention, a fluid food flow stream, which may be obtained from the outlet of a food extruder, is directed to the system in accordance with the invention which can include structure for splitting the main flow stream into a plurality of substreams for further processing, including the introduction of a desired fluid additive. In connection with this aspect of the invention, a plurality of passageways can be provided with each passageway having one of the fluid additive injection devices. Structure is provided for supplying an equal amount of the fluid additive to each of the additive injection devices without a flow control valve or other adjustable flow control structure or mechanism.

In accordance with another aspect of the invention, the structure for supplying the fluid additive to each of the additive injection devices includes a piping system and a single pump. The piping system is in fluid communication with each of the manifolds of the fluid additive injection devices, including a separate delivery pipe to each manifold, with the piping system being configured so that the flow rate of the fluid additive at a given pump output is the same to each manifold.

In accordance with another aspect of the present invention, a plurality of passageways, each containing a fluid additive injection device, is provided, which may be an even number of passageways with a separate pump and piping system supplying a single pair of fluid additive injection devices.

In accordance with still another aspect of the present invention, a method of injecting a fluid additive into a relatively viscous fluid food stream traveling in a passageway is provided. The passageway has an interior wall in which the injected fluid additive avoids contact on the interior wall of the passageway. In accordance with the method, a fluid additive injection device is provided and associated in operative relation with the passageway for injecting the fluid additive into the fluid food flow. The injection device can be as previously described and may include a fluid additive manifold, a plurality of elongated ribs extending from the manifold and which extend transversely across at least a portion of the passageway. The manifold may have an internal fluid additive supply channel, with each of the ribs having an internal fluid additive bore that extends along an axial length of the rib in fluid communication with the channel and with the interior of the passageway through a rib aperture located along a central portion of the downstream portion of the rib and spaced transversely from the interior wall of the passageway. In addition, a pair of elongated fins may be associated with each rib and disposed between the interior wall and the end of a rib aperture, which fins extend downstream of their respective rib for preventing fluid injected through the slot from the manifold and into the passageway from contacting or pooling along the interior wall of the passageway. The method further includes passing the relatively viscous fluid food through the passageway and injecting a fluid additive into the fluid additive injection device, through the rib apertures of the injection device and into the viscous fluid food, the fins preventing the fluid additive from contacting or pooling along the wall of the passageway.

In addition, the present invention provides for a system and method of introducing a uniform amount of additive across a plurality of subflow passageways. A positive displacement pump capable of generating pressure in excess of each subflow passageway is connected between the additive source and each additive injection cartridge located in the subflow passageways. Tubing or piping between the pump and each subflow passageway may include a suitable restriction or fixed diameter for adjusting the pressure drop between the pump and each additive injection cartridge. For example, a narrow diameter tube could be used to connect the pump to a subflow passageway that is located closer to the pump than another subflow passageway located further from the pump wherein a wider diameter tube or pipe could be used to connect the pump to the longer subflow passageway. Consequently, the additive flow rate into each additive injection cartridge can be uniform without a flow control valve. This ensures that the amount of additive dispersed throughout each extrudate subflow is the same, thereby producing a uniform food product yield from the plurality of subflow passageways.

Alternatively, the fluid additive delivery system can consist of a relatively large diameter pipe that supplies the individual injector cartridges. Preferably, any piping that connects the large diameter pipe with the individual injector cartridge is of relatively the same length and diameter.

Alternatively, when a uniform additive blend across all extrudate subflows is not desired, one embodiment of the present invention provides for a plurality of pumps wherein the number of pumps is at most one less than the number of subflow passageways. Here, the pressure drop across each additive injection cartridge need not be uniform. With this arrangement, one pump can provide additive to two or more subflow passageways. Thus, different additives may be introduced to different subflow passageways or varying amounts of the same additive may be introduced to different subflow passageways.

The present invention further provides for an additive injection cartridge that uniformly disperses additive throughout each corresponding extrudate subflow. The additive injection cartridge may be disk-shaped and partitions the extrudate subflow by means of a plurality of parallel ribs which are positioned perpendicular to the direction of the extrudate subflow in each passageway. In a preferred embodiment, the upstream surface of each rib comes to a point wherein the apex of the point partitions the oncoming subflow. This apex reduces the friction between the ribs and the subflow during partitioning, thereby assisting to reduce the pressure drop across the additive injection cartridge.

Another aspect of the invention provides fins on the downstream surface of each rib. These fins are important in restricting the migration or flow of the additive fluid to the exterior of the food stream before the extrudate-additive combination reaches the static mixers.

According to a further aspect of the present invention, bores within the ribs extend through the disk with orifices on each end. This allows for easy maintenance and cleaning of the rib interior.

DETAILED DESCRIPTION OF THE INVENTION

Figure 1:
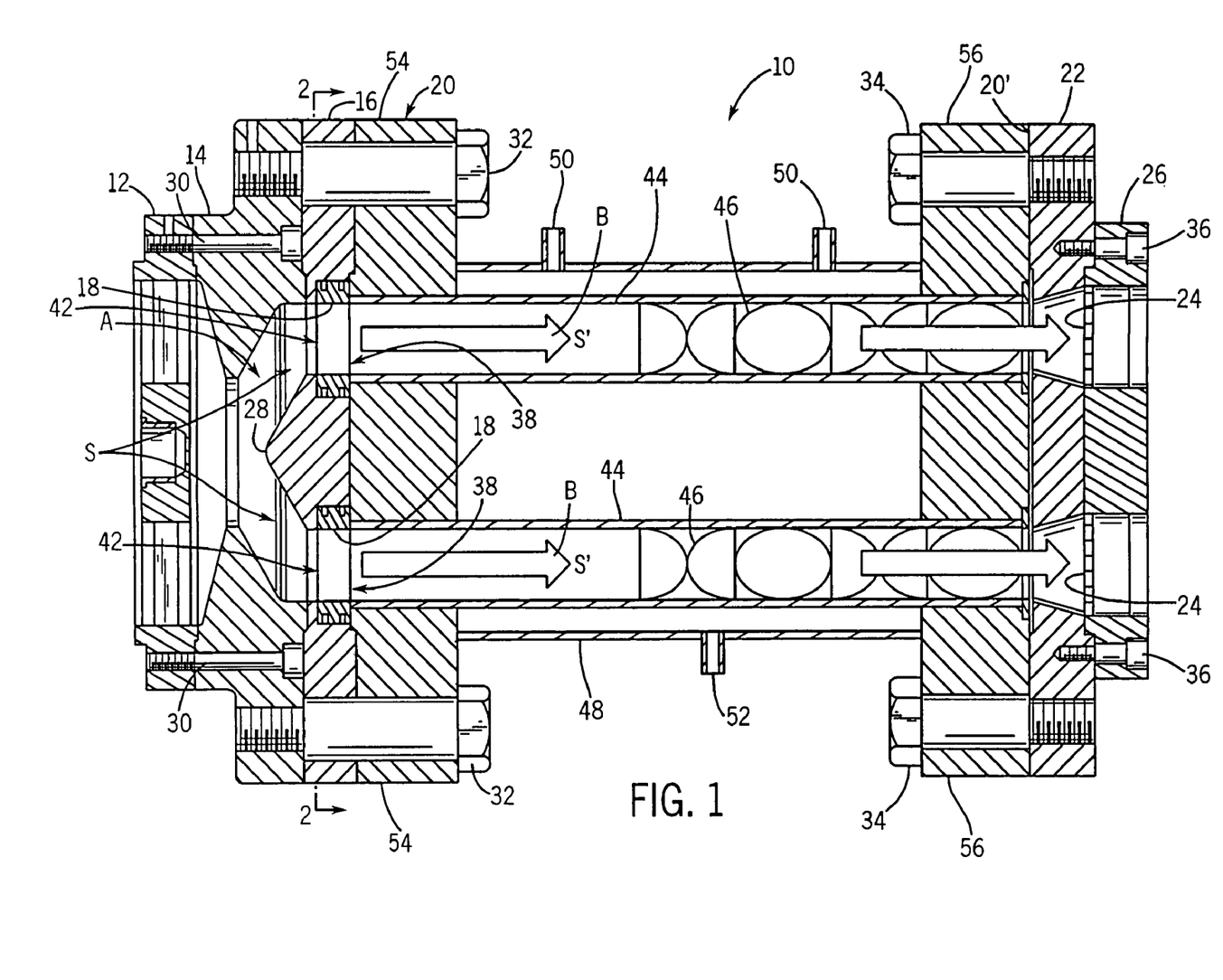
FIG. 1 is a sectional side view of an apparatus for adding a fluid additive into a viscous fluid food stream in accordance with the invention.

Referring now to the drawings generally, and in particular to FIG. 1, there is illustrated a food processing device 10 in accordance with the present invention. Device 10 is ideally suited for processing cooked cereal dough, which is typically a relatively viscous fluid. Such doughs typically are in the viscosity range of from about 200,000 to about 1,000,000 centipoise. The dough is processed to form a ready to eat (RTE) cereal.

Upstream of device 10 is an extruder cooker (not shown) of standard construction. Such devices are well known in the art. The extruder cooker produces a viscous, plastic cooked cereal dough which is fed to food processing device 10.

Food processing device 10 includes an adapter plate 12 for interfacing device 10 with the extruder cooker, an inlet transition plate 14, a fluid additive, injector cartridge flange 16, fluid additive injector cartridge 18, a static mixer assembly 20, an outlet transition plate 22, breaker plates 24 and a die plate 26. A suitable cutter assembly (not shown) can be utilized downstream of die plate 26 to divide the extruded food as it exits die plate 26 into desired lengths which may be subjected to further processing, such as formation into flakes, sheets or puffed pieces.

Inlet transition plate 14 provides a constricted diameter for fluid food leaving the extruder cooker at the inlet to food processing device 10. A constricted diameter increases the pressure in food stream S which in this embodiment is split into six food substreams S', as indicated by arrows A, for ease of processing, in which the streams S' travel in the direction indicated by arrows B in FIG. 1. The split into six streams S' occurs as the fluid food dough travels into fluid additive cartidge flange 16. Flange 16 includes a center cone section 28 which facilitates the flow of dough into the six separate substreams S', helping to prevent the formation of any void spaces.

Inlet transition plate 14 is secured to adapter plate 12 by means of a suitable fastener, which may be threaded fasteners 30. Similarly, inlet transition plate 14, fluid additive cartridge flange 16, static mixer assembly 20, transition plate 22 and die plate 26 are also secured together, as illustrated in FIG. 1 by means of suitable fasteners such as threaded fasteners 32, 34 and 36.

Figure 2:
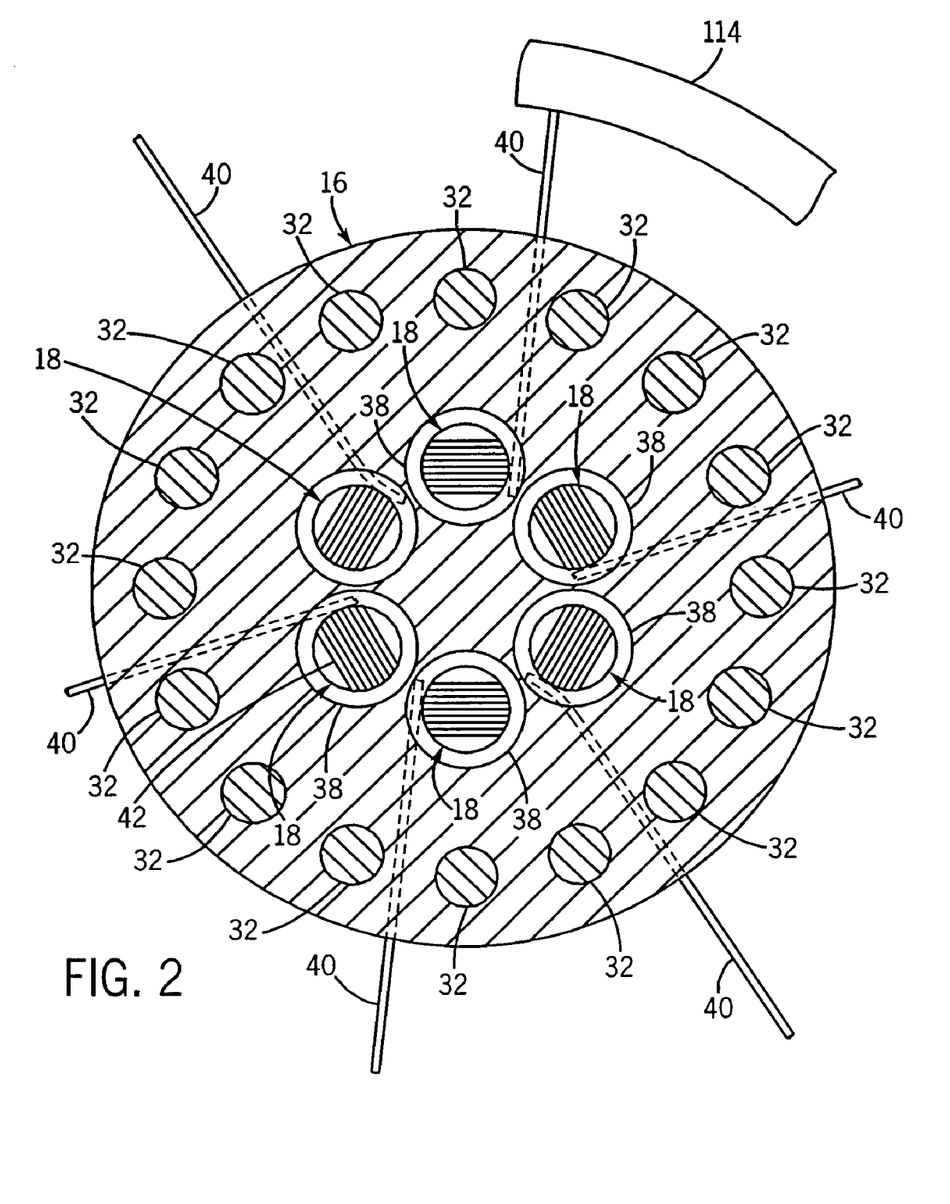
FIG. 2 is a sectional plan view of the apparatus of FIG. 1 along line 2—2.

Fluid additive cartridge flange 16 is disc-shaped and includes recesses 38 adapted for mounting fluid additive injector cartridges 18 therein, as shown in FIGS. 1 and 2. A fluid additive supply line 40 is provided for each injector cartridge 18. Supply lines 40 in flange 16 are preferably straight to readily permit cleaning, which may include cleaning by drilling or boring through any accumulated material or residue in supply lines 40. Flange 16 defines six passageways 42 in conjunction with injector cartridge 18 and static mixer assembly 20.

Static mixer assembly 20 is composed of an elongated tubular structure 44 in which is disposed static mixer flights 46, shown schematically in FIG. 1. Tubular structure 44 is jacketed with jacket 48 to permit heating or cooling as desired with an appropriate fluid through inlet ports 50 and outlet port 52. A sufficient length of mixer flights 46 are provided to achieve the desired degree of mixing for a particular product, which may range from light mixing to complete mixing. Less than complete mixing can produce a marbled or swirled effect, which can be an appearance (if colorant is utilized as the fluid additive) and/or a concentration gradient. Assembly 20 also includes appropriate mounting flanges 54 and 56.

Mounted at the discharge end 20' of mixer assembly 20 is transition plate 22, which slightly expands passageways 42 from an upstream to downstream direction. The mixed fluid food with the injected fluid additive then travels through breaker plate 24 which is composed of a plurality of apertures, after which the fluid food travels through die plate 26 for division into individual lengths or ropes, which can then be divided into discrete lengths or pellets, to be processed further as desired, such as by flaking, sheeting or puffed pieces.

Referring to FIGS. 5–11, various aspects of fluid additive injector cartridge 18 are illustrated in detail. Cartridge 18 includes a fluid additive manifold 58 which is a straight bore having an external line of sight access 58' to readily permit cleaning such as by boring or drilling, for example. Manifold 58 is aligned with its respective fluid additive supply line 40 in cartridge flange 16. Such alignment is facilitated by locator pins or dowels 60 in cartridge 18 and complementary holes (not shown) of recess 38 of flange 16, so that when cartridge 18 is in position as shown in FIG. 1 in flange 16, pins 60 are contained in the complementary holes of flange 16.

Injector cartridge 18 may have an annular body 62 in which manifold 58 is located. Grooves 64 and 66 extend around the outer periphery of annular body 62 to contain O-rings 68 and thereby provide a fluid-tight seal when mounted in flange 16 as hereinafter described.

Figure 5:
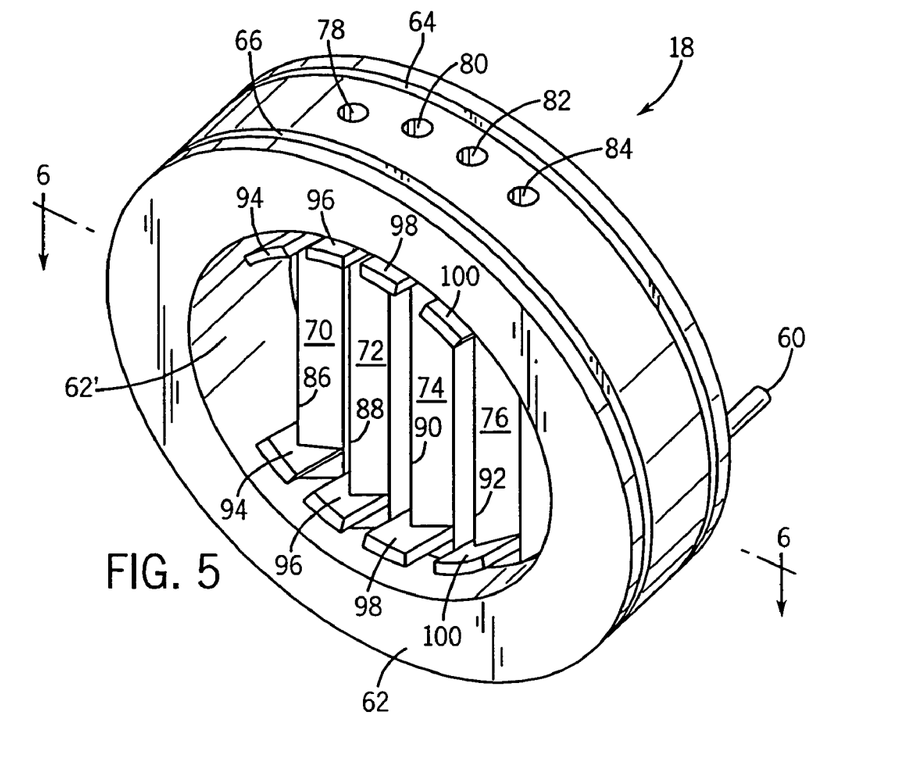
FIG. 5 is a perspective view of a fluid additive injector device in accordance with the invention.

A plurality of ribs 70, 72, 74 and 76 extend from one side of the annular opening to the other as shown in FIGS. 5, and 7–9. Each rib has a longitudinally extending bore 78, 80, 82 and 84, respectively, each of which communicates with manifold 58 and extends through the opposite side of annular body 62, as shown in FIGS. 5–8. Bores 78, 80, 82 and 84 are straight and provide an external line of sight access where bores 78, 80, 82 and 84 extend through annular body 62 as shown in FIG. 5 to readily permit cleaning, including by drilling or boring, for example. O-rings 68 provide a fluid-tight seal to prevent any fluid in bores 78, 80, 82 and 84 from entering passageway 42 when injector cartridges 18 are installed in cartridge flange 16.

Figure 6:
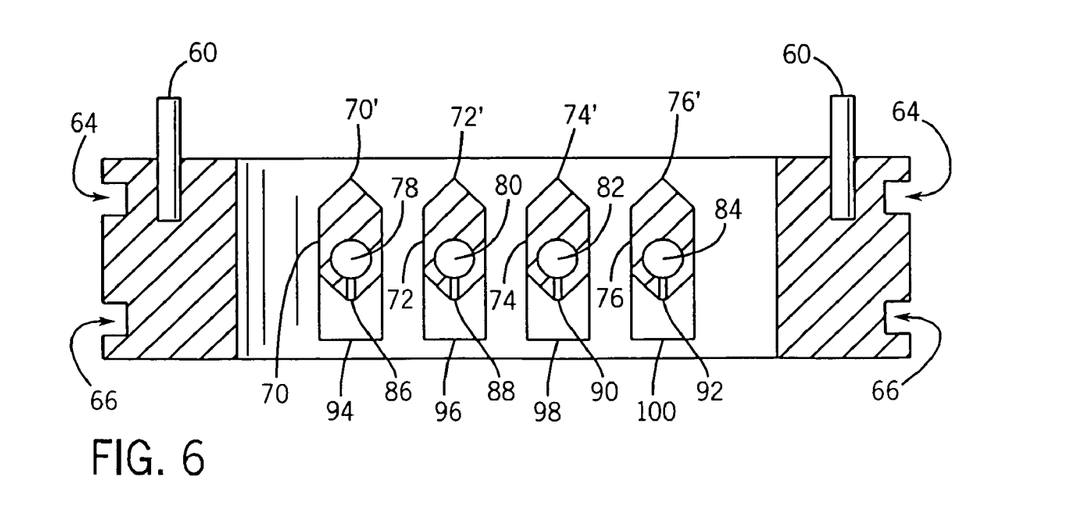
FIG. 6 is a sectional view of the injector device along line 6—6 of FIG. 5.
Figure 7:
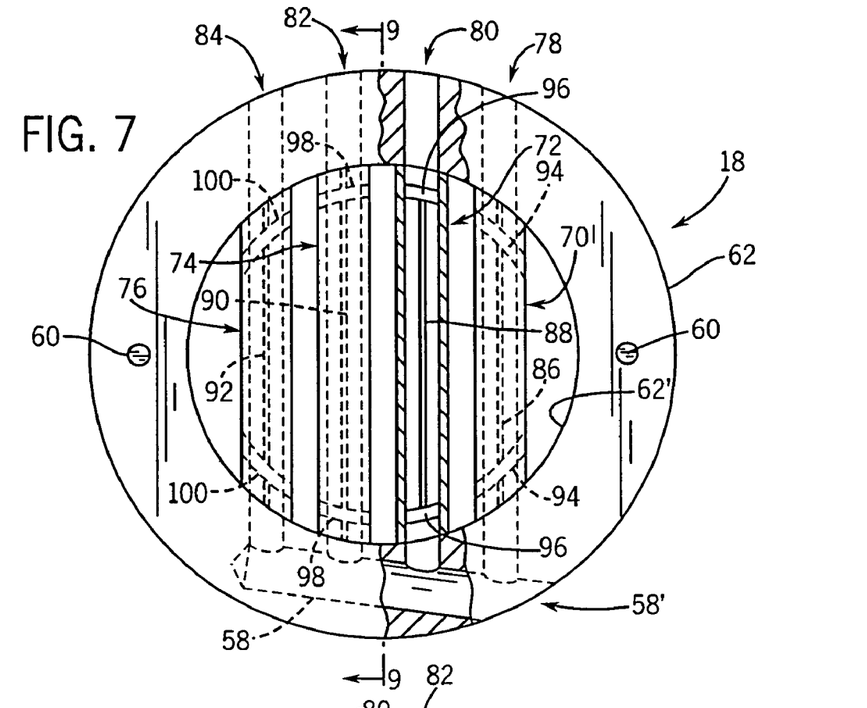
FIG. 7 is a rear elevation view, partly in section, of the injector device of FIG. 5.
Figure 8:
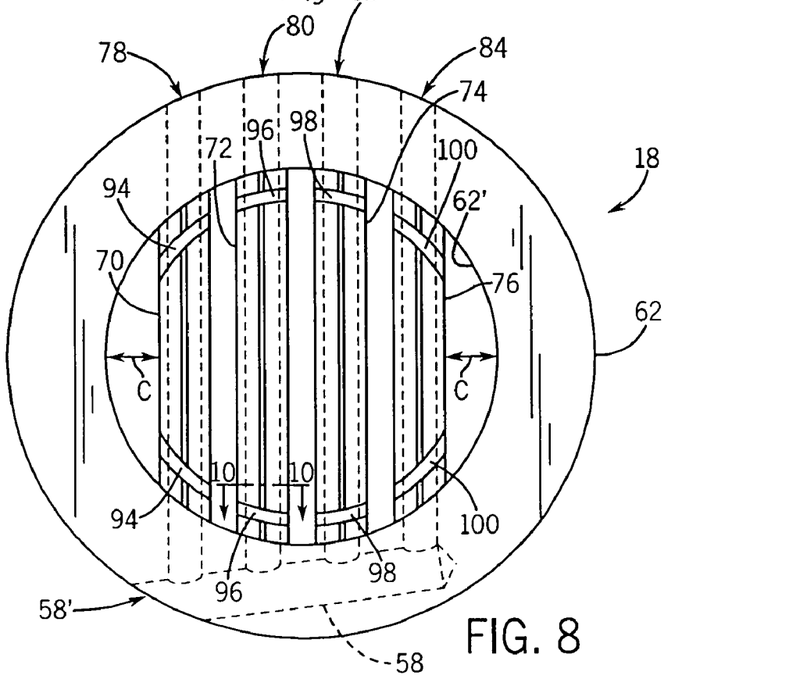
FIG. 8 is a front elevation view of the injector device of FIG. 5.
Figure 9:
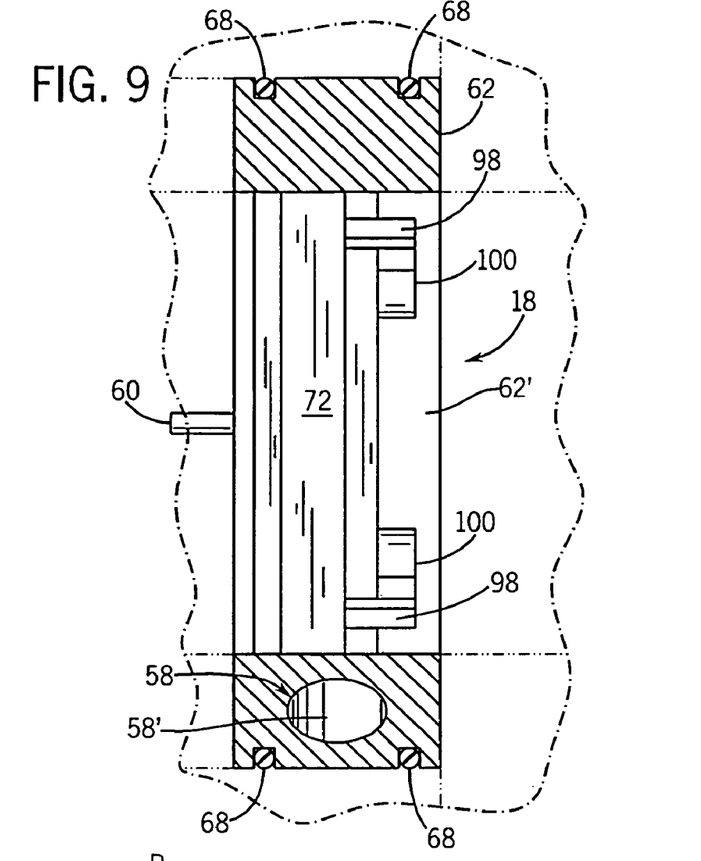
FIG. 9 is a sectional view of the injector device along line 9—9 of FIG. 7.
Figure 10:
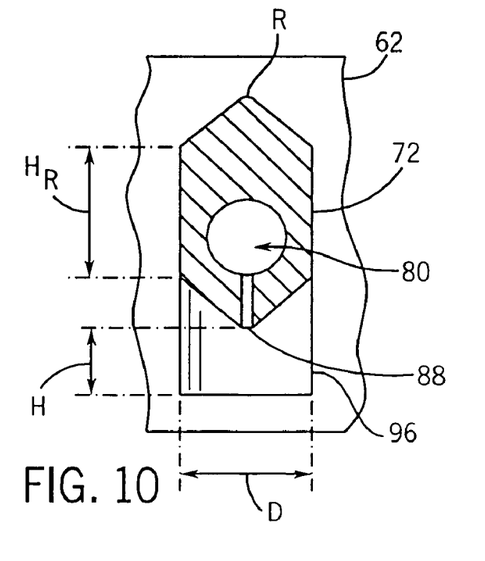
FIG. 10 is a fragmentary sectional view of the injector device along line 10—10 of FIG. 8.

Ribs 70, 72, 74 and 76 preferably have an upstream streamlined shape as shown in FIG. 6 so that a viscous fluid food (which may be a cereal dough) readily passes around and past ribs 70, 72, 74 and 76. In this case, the streamlined shape is a wedge shape with the upstream leading edge 70', 72', 74' and 76' of ribs 70, 72, 74 and 76 being wedge-shaped having an angle of about 90°. For the illustrated embodiment and recited dimensions, the point of the wedge shape has a radius of curvature that is about 0.060 inches, as indicated by R in FIG. 10. In addition, ribs 70, 72, 74 and 76 have a height $H_R$ as shown in FIG. 10 of about 0.313 inches.

The downstream side of ribs 70, 72, 74 and 76 each have an elongated slot aperture 86, 88, 90 and 92, respectively, that communicate with bores 78, 80, 82 and 84, respectively. The volume of bores 78, 80, 82 and 84 is relatively large compared to the area of slot apertures 86, 88, 90 and 92.

Each slot aperture 86, 88, 90 and 92 is elongated and extends longitudinally of respective rib 70, 72, 74 and 76, and extends along a central portion of the downstream facing side of such ribs. In one embodiment, for an inner diameter annular body 62 of about 3 inches, each of slot apertures 86, 88, 90 and 92 is about 0.020 centimeters wide and the diameter of each of bores 78, 80, 82 and 84 is about 0.188 inches. Ribs 70, 72, 74 and 76 have a spacing therebetween of about 0.219 inches with the maximum spacing between end ribs 70 and 76 and the interior of annular body 62 as indicated by arrows C being about 0.472 inches.

Each rib 70, 72, 74 and 76 on the downstream side thereof has a pair of fins 94, 96, 98 and 100, respectively, that extend downstream from the ribs and longitudinally of annular body 62 and thus of passageway 42 when mounted in food processing device 10.

Preferably, each end of slot apertures 86, 88, 90 and 92 terminates about ³⁄₃₂ inch before each of fins 94, 96, 98 and 100.

Fins 94, 96, 98 and 100 preferably are slightly curved and thus are concentric to inner diameter curvature 62' of annular body 62. In the illustrated embodiment of FIGS. 5–10, fins 94, 96, 98 and 100 have a width of about 0.375 inches as indicated by arrow D and a height from the tip of rib 72 where aperture 88 is located of about 0.25 inches, indicated by arrow H in FIG. 10. Fins 94, 96, 98 and 100 should have sufficient thickness for the desired structural rigidity for the intended operating environment.

In addition, fins 94, 96, 98 and 100 are radially inwardly located approximately 0.20 inches from the inner surface of annular body 62, for annular body 62 having a diameter of about 3 inches.

Figure 11:
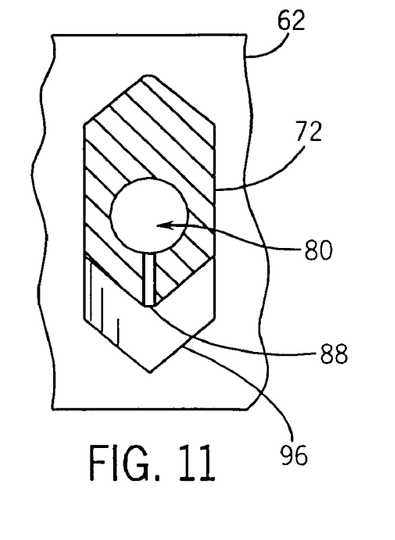
FIG. 11 illustrates an alternative embodiment of the portion of the injector device shown in FIG. 10.

Fins 94, 96, 98 and 100 have a rectangular profile as shown in FIG. 10, which is preferred compared to other profile shapes, such as the triangular profile shown in FIG. 11, where like reference numerals represent like elements. The rectangular profile functions more effectively in keeping fluid injected out of bore 80 and slot aperture 88 from reaching the wall of passageway 42.

Preferably, for the illustrated embodiment, the ratio of the interior diameter of passageway 42 (and also interior annular diameter of annular body 62) to fin width D is in the range of from about 6 to 10 and the ratio of passageway 42 diameter to fin length H is in the range of from about 8 to about 15, as shown in FIG. 10.

Figure 3:
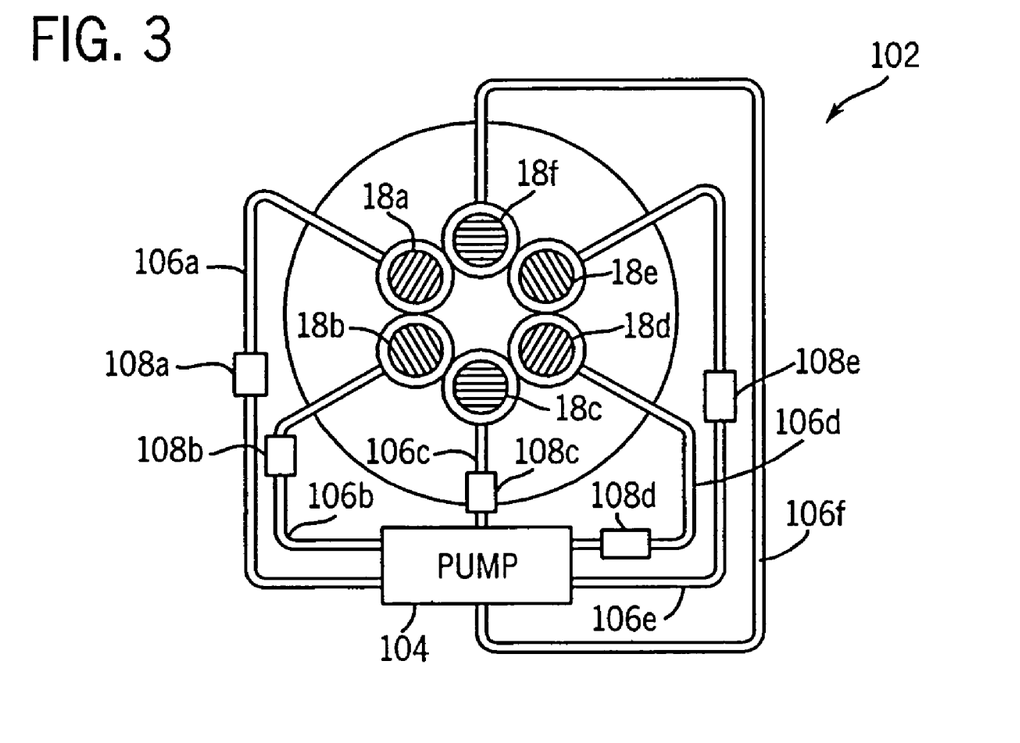
FIG. 3 is a schematic flow diagram for injection of a fluid additive.
Figure 4:
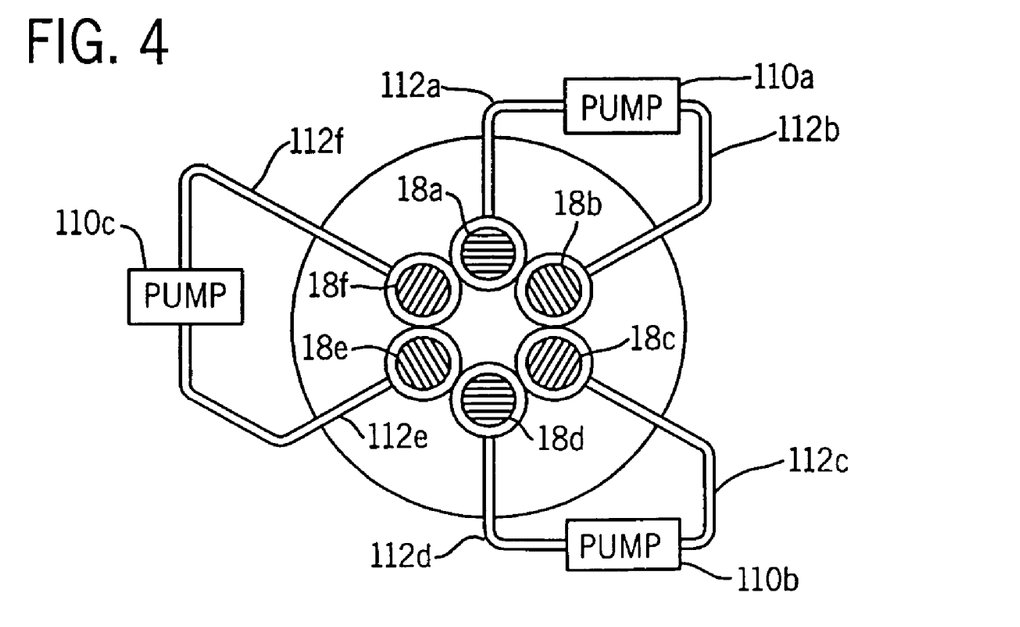
FIG. 4 is an alternative schematic flow diagram for injection of a fluid additive.

Referring to FIGS. 3 and 4, there are illustrated various fluid additive delivery systems in accordance with the invention. More specifically, a fluid additive delivery system 102 in FIG. 3 includes a pump and pump manifold 104 (shown schematically), piping segments 106a–f, and six injector cartridges 18e–f. Pump 104 preferably is a positive displacement pump to reduce the chance that fluid food in passageway 42 would travel into any of injector cartridges 18a–f. In one embodiment, the length of piping segments 106a–f are of the same length, geometry and diameter, so that uniform fluid additive flow rates are achieved without the use of any flow control valves or other adjustable flow control devices. Alternatively, for different lengths of piping segments 106a–f longer segments can be of larger diameter, or shorter segments can be of smaller diameter or otherwise have fixed restrictions 108a–e therein to provide the same flow rate at a given pump output.

Alternatively, different flow rates may be provided by providing for different pressure drops between pump 104 and injectors 18a–f as desired without an adjustable flow control valve or other adjustable flow controller.

Referring to FIG. 4, an alternate fluid additive delivery system is illustrated composed of three pumps and pump manifolds 110a–c, piping segments 112a–f and six injector cartridges 18a–f. Each of pumps 110a–c supplies a fluid additive to two separate injector cartridges 18a–f. The additive supplied by each pump may be the same or different as desired. Uniform or different flow rates can be provided as described with respect to FIG. 3.

Referring to FIG. 2, an alternate fluid delivery system is illustrated in which a pump (not shown) supplies the additive fluid under a desired pressure to a relatively large diameter pipe 114 (shown in fragmentary view) which is used to supply each of fluid additive delivery lines 40. Pipe 114 should preferably have a diameter of at least about two to four or more times the diameter of one of delivery lines 40.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. An apparatus for introducing a fluid additive into each of a plurality of viscous food substreams formed from a single viscous fluid food stream comprising
   a passageway having an interior wall to accommodate a single viscous fluid food stream through the interior of the passageway;
   a single dividing member operatively connected to said passageway for dividing the single viscous fluid food stream into a plurality of viscous fluid food substreams;
   for each of the viscous fluid food substreams, a separate individual subpassageway having an interior to accommodate each viscous fluid food substream, the interior of each of the individual subpassageways in fluid communication with the dividing member;
   a plurality of fluid additive injection devices for said viscous fluid food substreams, each individual subpassageway having a fluid additive injection device disposed within said interior of the individual subpassageway, each individual fluid injection device being located within and in operative relation only with the subpassageway within which the injection device is disposed wherein each of said injection devices includes at least one rib having an upstream surface and a downstream surface, said upstream surface of each rib being shaped and oriented so that the fluid substream passes around and past each rib, said downstream surface of each rib having an elongated slot aperture disposed therein extending longitudinally along said rib for introducing a fluid additive into such respective fluid food substream, and wherein each of said injection devices further includes at least one fin located between at least one rib and said interior of said individual subpassageway; and
   a single fluid additive supply source in fluid communication with said plurality of fluid additive injection devices and with each said elongated slot aperture.

2. The apparatus of claim 1 wherein the dividing member divides the single viscous food stream into at least three fluid food substreams, each substream having a substantially equal flow rate in the absence of an adjustable substream flow control apparatus.

3. The apparatus of claim 1 further comprising a pump for supplying fluid additive to each fluid additive injection device.

4. The apparatus of claim 3 wherein said pump provides a substantially equal amount of fluid additive to each fluid additive injection device.

5. The apparatus of claim 4 wherein said pump provides fluid additive to each injection device at a substantially uniform flow rate in the absence of an adjustable fluid additive flow control device.

6. The apparatus of claim 5 further comprising a single pump and a plurality of piping segments, each piping segment operatively connecting the pump to a corresponding fluid additive injection device.

7. The apparatus of claim 5 wherein a static fluid food mixer is disposed in each individual subpassageway downstream of said fluid additive injection device and mixes the fluid additive to a desired degree.

8. The apparatus of claim 7 wherein each individual subpassageway further comprises a corresponding exit port downstream of said static fluid food mixer, each exit port discharging a food product, the food product from each corresponding exit port being substantially uniform.

9. The apparatus of claim 3 further comprising a plurality of piping segments each piping segment operatively connecting the pump to a corresponding fluid additive injection device wherein the pump provides a different amount of fluid additive to at least two fluid additive injection devices in the absence of an adjustable fluid additive flow control device.

10. The apparatus of claim 9 wherein at least two piping segments have a different length.

11. The apparatus of claim 9 wherein at least two piping segments have a different diameter.

12. The apparatus of claim 2 wherein the dividing member constricts the single fluid food stream before dividing the single fluid food stream into at least three fluid food substreams.

13. The apparatus of claim 1 wherein at least one subpassageway further includes a breaker plate disposed downstream of said fluid injection device, the breaker plate including at least one restriction.

14. The apparatus of claim 13 wherein at least one subpassageway includes an expanding diameter from an upstream to downstream direction at a location upstream from said breaker plate.

15. A system for introducing a fluid additive into a plurality of relatively viscous fluid food streams comprising:
   a passageway having an interior wall to accommodate a single viscous fluid food stream through the interior of the passageway;
   a single dividing member operatively connected to said passageway for dividing the single viscous fluid food stream into a plurality of viscous fluid food substreams, the passageway being in fluid communication with each of the plurality of substreams;
   a plurality of fluid additive injection devices, each individual fluid injection device disposed within the interior of a single respective substream and being exclusively associated with, in operative relation with and located within only the single respective substream within which the injection device is disposed for injecting a fluid additive into each viscous fluid food substream, wherein each of said injection devices includes at least one rib having an upstream surface and a downstream surface, said upstream surface of each rib being shaped and oriented so that the fluid substream passes around and past each rib, said downstream surface of each rib having an elongated slot aperture disposed therein extending longitudinally along said rib, and wherein each of said injection devices further includes at least one fin located proximate to an end of at least one rib; and a single fluid additive supply source in fluid communication with said plurality of fluid additive injection devices and with each said elongated slot aperture; and a single pump for providing fluid additive from the additive supply source to each additive injection device in the absence of an adjustable fluid additive flow control device.

16. The system of claim 15 wherein the pump provides a substantially equal amount of fluid additive to each fluid additive injection device.

17. The system of claim 16 wherein the pump provides fluid additive to each injection device at a substantially uniform flow rate.

18. The system of claim 17 further comprising a plurality of piping segments, each piping segment operatively connecting the pump to a corresponding fluid additive injection device.

19. The system of claim 18 wherein the length of at least two piping segments is different.

20. The system of claim 19 wherein the diameter of at least two piping segments is different.

21. The system of claim 19 wherein at least one piping segment further comprises a piping restriction.

22. The system of claim 15 wherein at least one of said plurality of substreams includes a breaker plate disposed downstream of said fluid additive injection device.

23. The system of claim 22 wherein at least one substream include an expanding diameter from an upstream to downstream direction at a location upstream from said breaker plate.

24. A system for introducing a fluid additive into a plurality of relatively viscous fluid food streams comprising:

a passageway having an interior wall to accommodate a single viscous fluid food stream through the interior of the passageway;

a single dividing member operatively connected to said passageway for dividing the single viscous fluid food stream into a plurality of viscous fluid food substreams, the passageway being in fluid communication with each of the plurality of substreams;

a plurality of fluid additive injection devices, each individual fluid injection device disposed within the interior of a single respective substream and being exclusively associated with, in operative relation with and located within only the single respective substream within which the injection device is disposed for injecting a fluid additive into each viscous fluid food substream, wherein each of said injection devices includes at least one rib having an upstream surface and a downstream surface, said upstream surface of each rib being shaped and oriented so that the fluid substream passes around and past each rib, said downstream surface of each rib having an elongated slot aperture disposed therein extending longitudinally along said rib, and wherein each of said injection devices further includes at least one fin located proximate to an end of at least one rib; and a single fluid additive supply source in fluid communication with each of said plurality of fluid additive injection devices and with each said elongated slot aperture; and a plurality of pumps, each pump providing fluid additive from the additive supply source to two injection devices, in the absence of an adjustable fluid additive flow control device.

25. The system of claim 24 wherein at least two injection devices receive a different amount of fluid additive.

* * * * *